(No Model.) 7 Sheets—Sheet 1.
T. J. HOGAN.
AUTOMATIC FLUID PRESSURE BRAKE APPARATUS.
No. 554,623. Patented Feb. 11, 1896.

WITNESSES:
Chas. F. Miller.
Dannis S. Wolcott.

INVENTOR,
Thomas J. Hogan.
by J. Snowden Bell.
Att'y.

(No Model.) 7 Sheets—Sheet 2.
T. J. HOGAN.
AUTOMATIC FLUID PRESSURE BRAKE APPARATUS.

No. 554,623. Patented Feb. 11, 1896.

WITNESSES: Chas. F. Miller. Darwin S. Wolcott

INVENTOR, Thomas J. Hogan by J. Snowden Bell, Att'y.

(No Model.) 7 Sheets—Sheet 3.

T. J. HOGAN.
AUTOMATIC FLUID PRESSURE BRAKE APPARATUS.

No. 554,623. Patented Feb. 11, 1896.

WITNESSES:
Chas. F. Miller.
Daniel L. Wolcott.

INVENTOR,
Thomas J. Hogan.
by Snowden Bell,
Att'y.

(No Model.) 7 Sheets—Sheet 4.
T. J. HOGAN.
AUTOMATIC FLUID PRESSURE BRAKE APPARATUS.
No. 554,623. Patented Feb. 11, 1896.
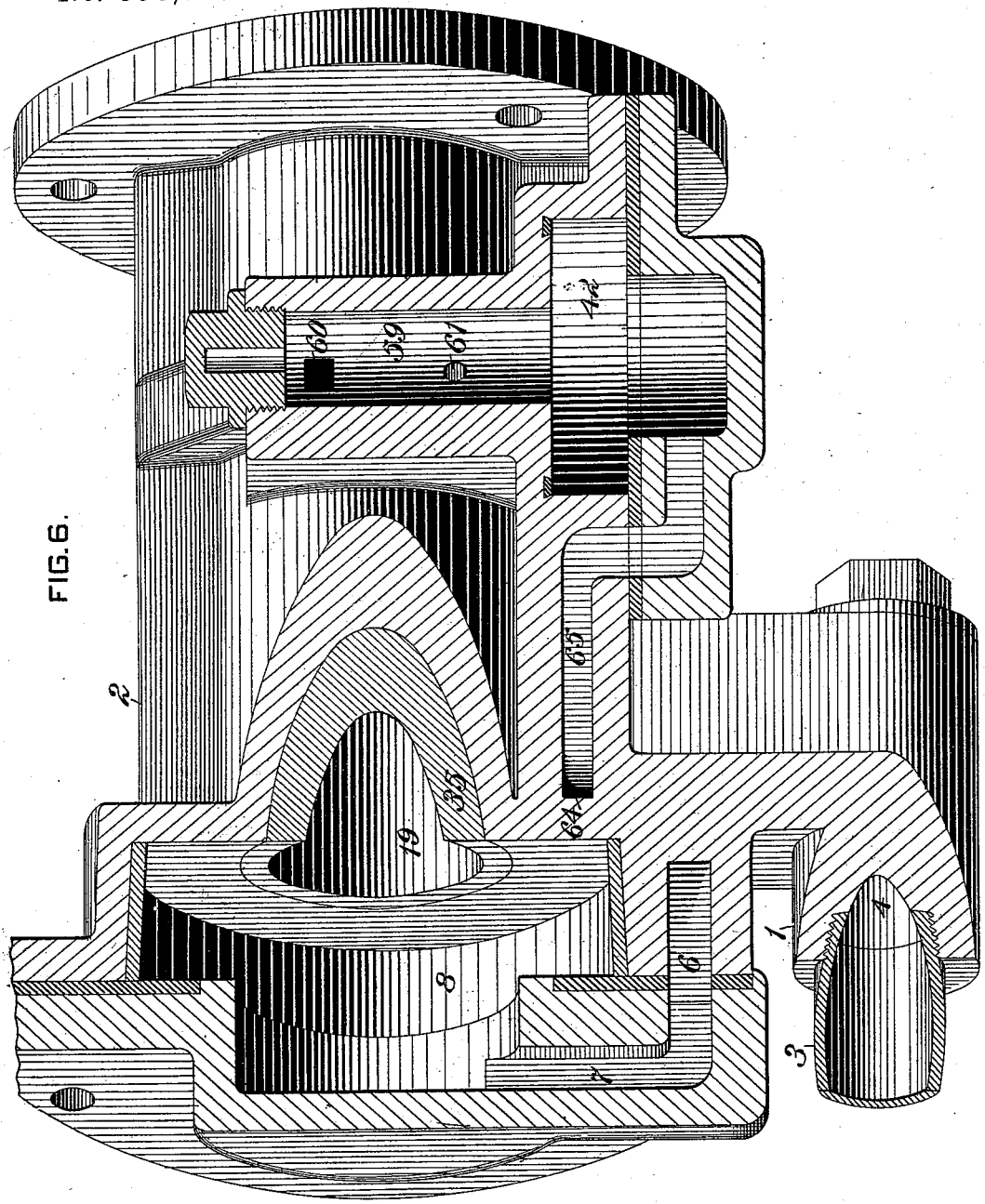
WITNESSES: INVENTOR
Chas. F. Miller. Thomas J. Hogan.
Dennis C. Wolcott. by J. Snowden Bell.
Att'y.

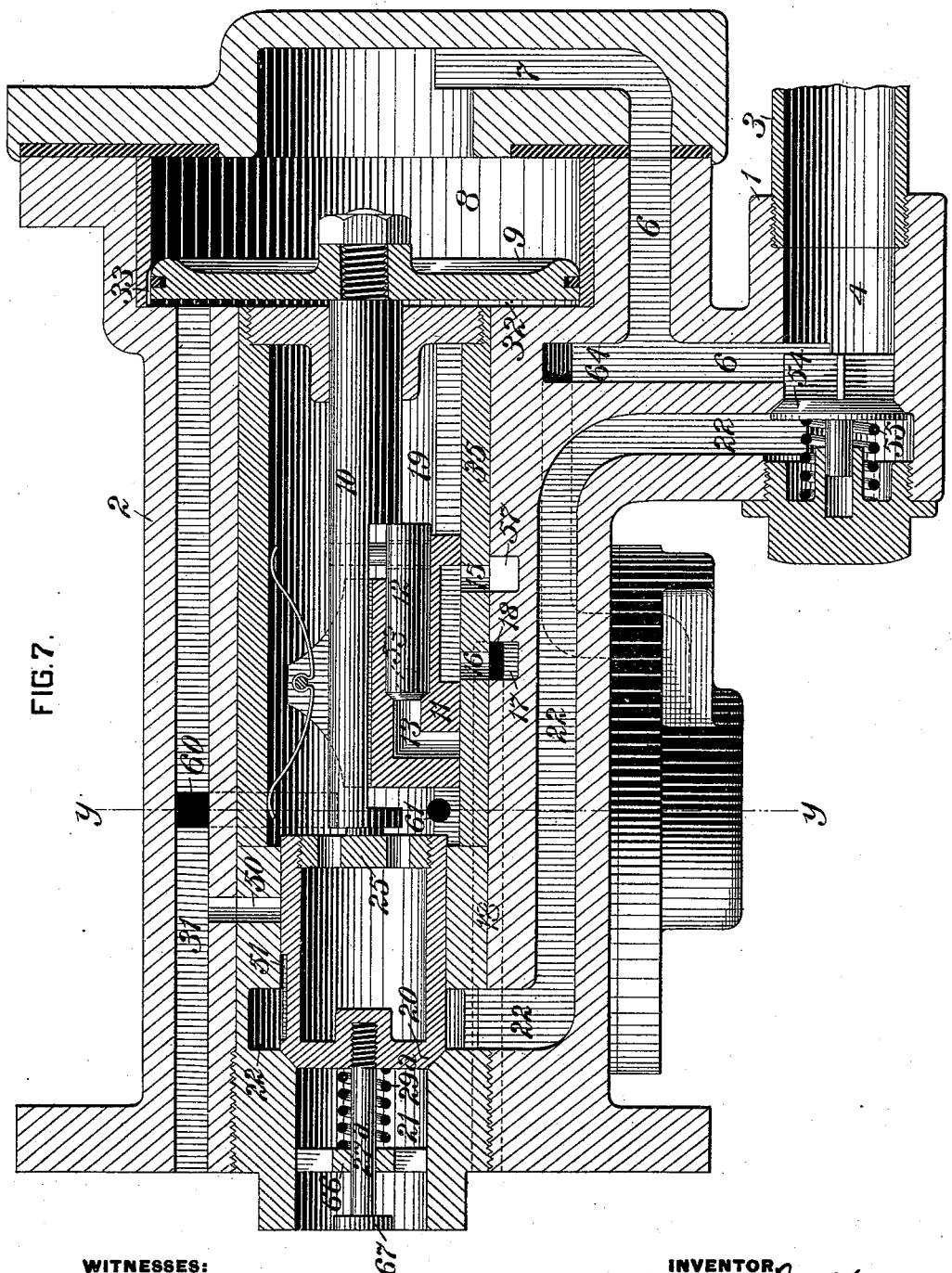

(No Model.) 7 Sheets—Sheet 6.

T. J. HOGAN.
AUTOMATIC FLUID PRESSURE BRAKE APPARATUS.

No. 554,623. Patented Feb. 11, 1896.

WITNESSES:
Chas. F. Miller
Darwin S. Wolcott

INVENTOR,
Thomas J. Hogan
by J. Snowden Bell
Att'y.

(No Model.) 7 Sheets—Sheet 7.
T. J. HOGAN.
AUTOMATIC FLUID PRESSURE BRAKE APPARATUS.

No. 554,623. Patented Feb. 11, 1896.

WITNESSES:
Chas. F. Miller.
Dennis S. Wolcott

INVENTOR
Thomas J. Hogan,
by J. Snowden Bell,
Att'y.

UNITED STATES PATENT OFFICE.

THOMAS J. HOGAN, OF PITTSBURG, ASSIGNOR TO THE WESTINGHOUSE AIR BRAKE COMPANY, OF WILMERDING, PENNSYLVANIA.

AUTOMATIC FLUID-PRESSURE BRAKE APPARATUS.

SPECIFICATION forming part of Letters Patent No. 554,623, dated February 11, 1896.

Application filed September 9, 1895. Serial No. 561,895. (No model.)

*To all whom it may concern:*

Be it known that I, THOMAS J. HOGAN, a citizen of the United States, residing at Pittsburg, in the county of Allegheny and State of Pennsylvania, have invented or discovered a certain new and useful Improvement in Automatic Fluid-Pressure Brake Apparatus, of which improvement the following is a specification.

The object of my invention is to provide an improvement in automatic fluid-pressure brake apparatus for railway-cars; and to this end it consists in new and improved means for effecting a quick, powerful, and nearly simultaneous application of the brakes, in the combination of such means with a triple-valve device, and in certain combinations and features of construction, all as hereinafter fully set forth.

Figure 1:
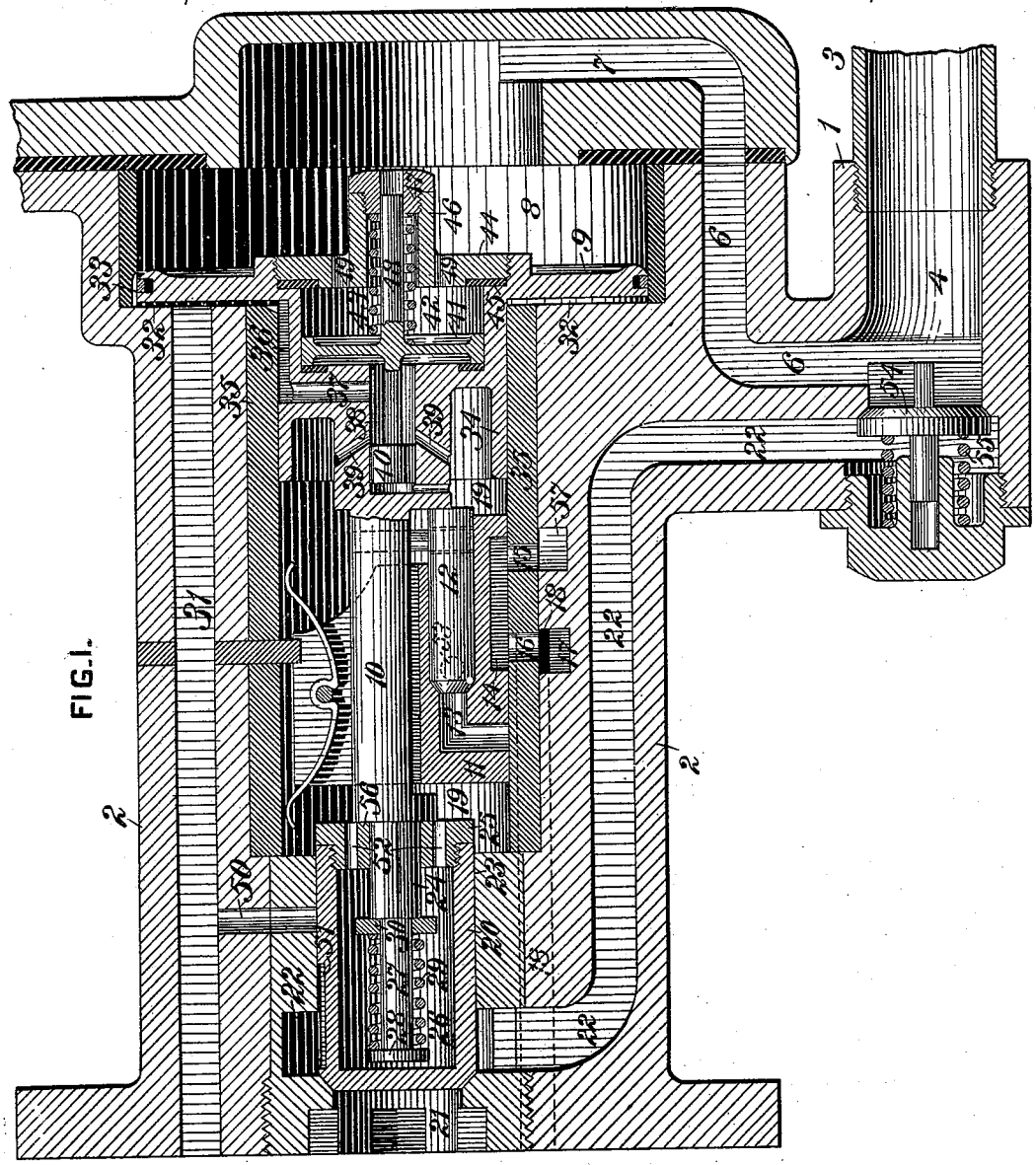
Figure 2:
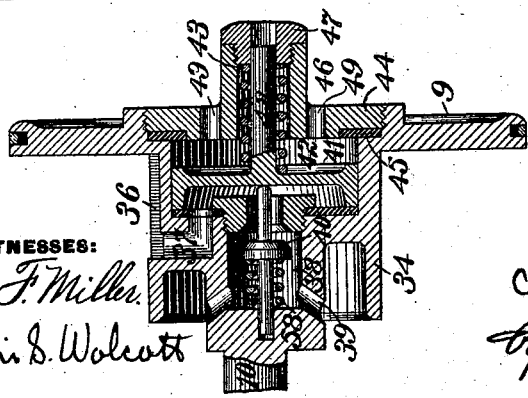
Figure 3:
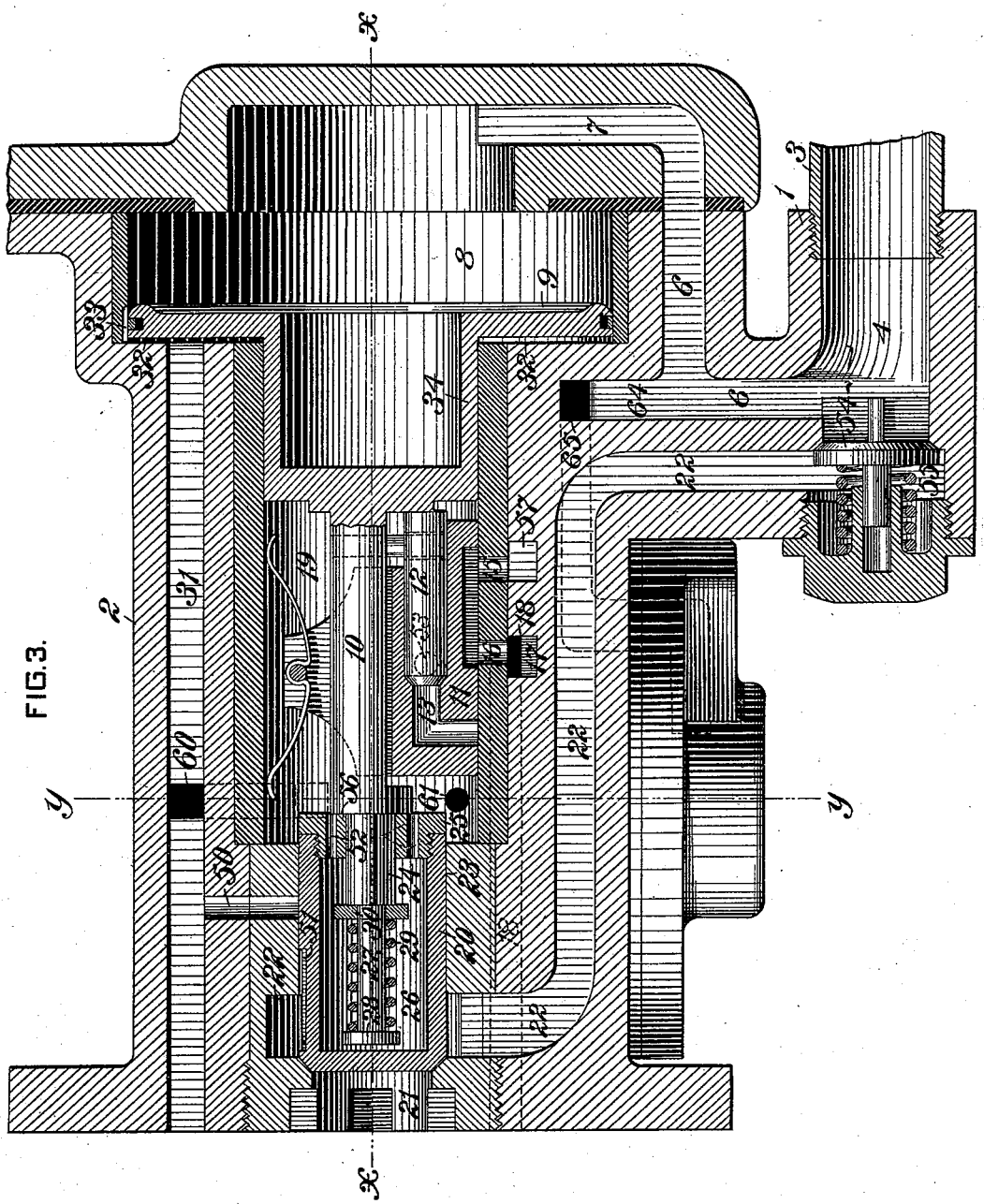
Figure 4:
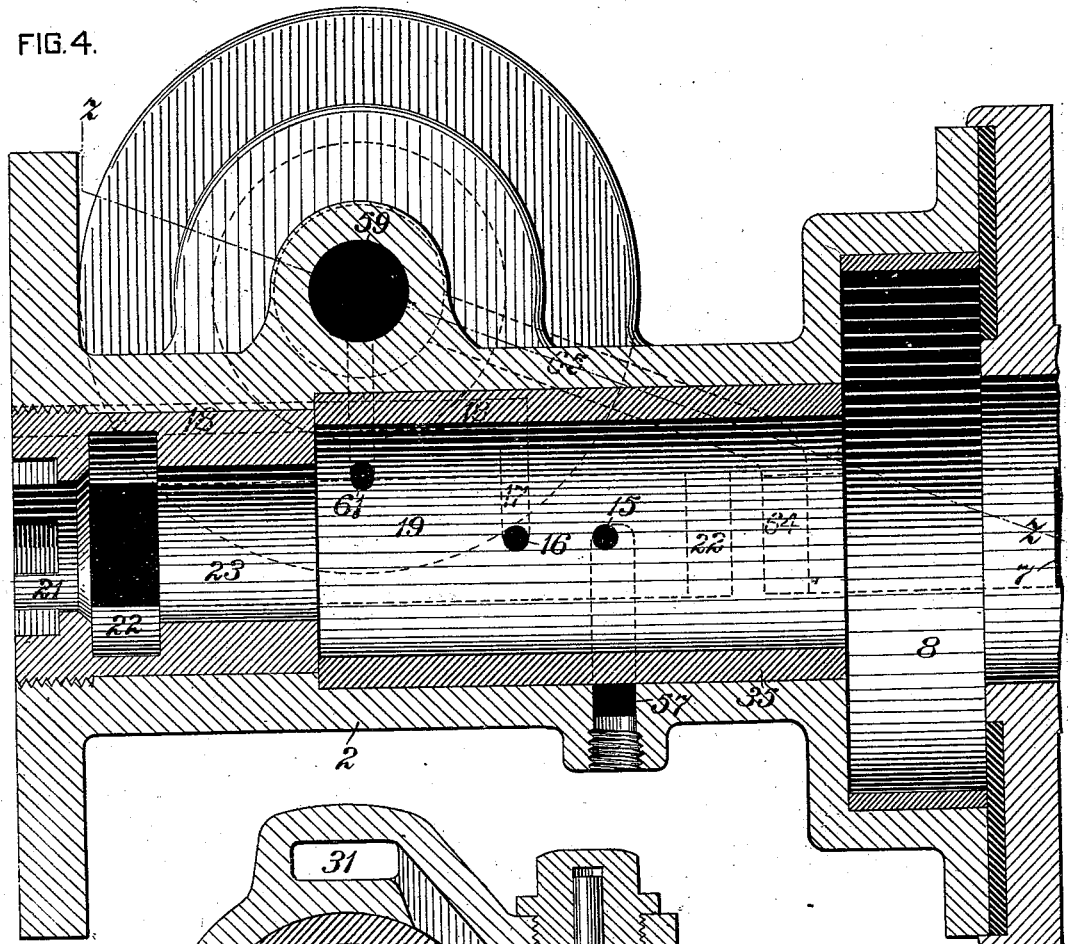
Figure 5:
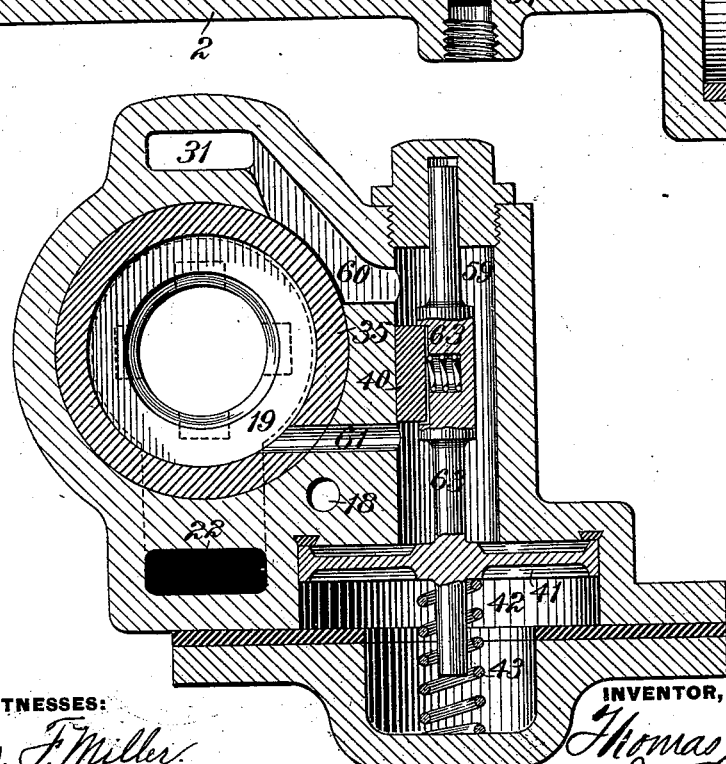
Figure 9:
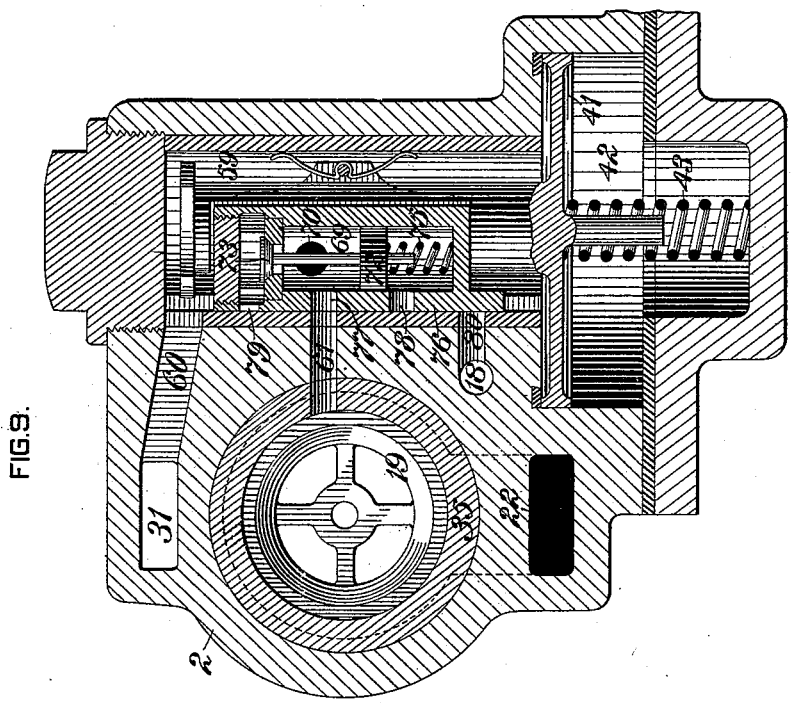
Figure 8:
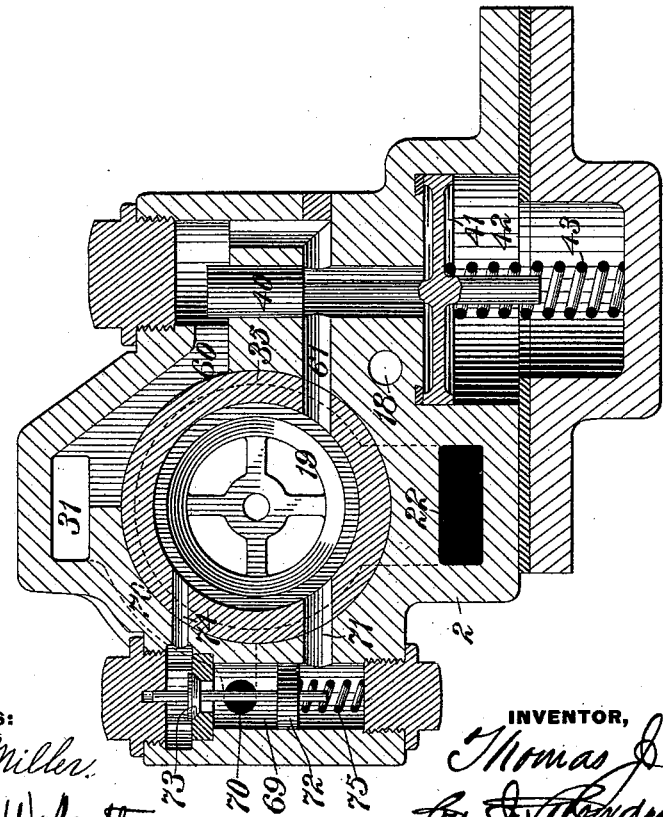
Figure 11:
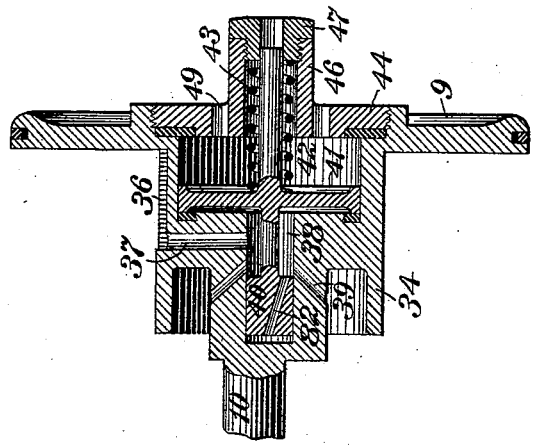
Figure 10:
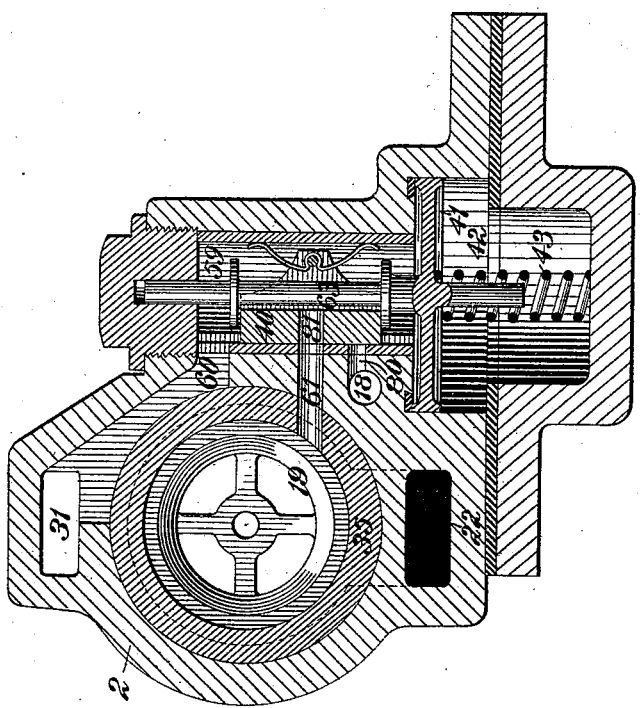

In the accompanying drawings, which illustrate applications of my invention, Figure 1 is a central longitudinal section through a quick-action triple-valve device, showing an application of my improvement; Fig. 2, a central section through a triple-valve piston, showing a modification of the valve device for cutting off communication between the auxiliary reservoir and the main-valve chamber; Fig. 3, a central longitudinal section through a quick-action triple-valve device in which the cut-off-valve device is located in a chamber on one side of the main-valve chamber; Fig. 4, a section on the line $x\ x$ through the casing of the triple-valve device shown in Fig. 3, the valves being removed to show by dotted lines the location of the passages leading from the main-valve chamber and train-pipe to the brake-cylinder, and from the train-pipe to the cut-off piston-chamber; Fig. 5, a transverse section on the line $y\ y$ of Fig. 3, showing the cut-off-valve device located in a chamber on one side of the main-valve chamber; Fig. 6, a section on the line $z\ z$ of Fig. 4, showing the connection of the cut-off piston-chamber with the passage leading from the train-pipe; Fig. 7, a central longitudinal section through a triple-valve device, showing a modification of the emergency-valve device and of the means for separating the triple-valve piston-chamber from the main-valve chamber; Figs. 8, 9, and 10 are transverse sections showing modifications of the cut-off-valve device which may be employed with the constructions shown in Figs. 3 and 7; and Fig. 11 is a central section through a triple-valve piston, showing a modification of the cut-off-valve device shown in Fig. 1.

In the embodiment of my invention as shown in the drawings, I employ, in combination with a simple triple-valve device, the piston of which has the same traverse in both service and emergency applications, a cut-off-valve device which controls and in emergency applications is adapted to cut off the passage of fluid from the auxiliary reservoir to the main-valve chamber of the triple-valve device. An emergency-port is controlled by a valve device which is normally seated so as to close the emergency-port, and which remains seated during service applications, but which is opened by the pressure of a spring only, unassisted by fluid-pressure.

The emergency-valve device is acted on by the pressure of the fluid in the main-valve chamber when the brakes are off and during service applications of the brakes.

The operation of the triple valve proper or the parts whose movements admit fluid from the auxiliary reservoir to the brake-cylinder in service applications and exhaust it therefrom in releasing the brakes is the same in both service and emergency applications—that is, the main-valve chamber is put in communication with the brake-cylinder through the same ports in both service and emergency applications. In service applications communication between the auxiliary reservoir and the main-valve chamber remains open, the emergency-valve device is exposed to auxiliary-reservoir pressure, and a passage is opened by the triple-valve device to admit auxiliary-reservoir fluid from the main-valve chamber to the brake-cylinder.

In emergency applications the cut-off-valve device closes communication between the auxiliary reservoir and the main-valve chamber, the triple-valve device opens the same passage or passages from the main-valve chamber to the brake-cylinder as in service applications, and the reduction or total removal of the pressure in the main-valve chamber, which pressure normally and during service applications acts on the emergency-valve device, permits the unseating of the emergency-valve by means of a spring which may be brought into action by the movement of the triple-valve piston, or which may be normally under compression and permitted to expand only when the reduction of pressure on the emergency-valve device is caused by the closing of the cut-off valve.

In Fig. 1 of the drawings a screw-threaded nozzle 1 on the main casing 2 of the triple-valve device is connected with the main train-pipe by means of a branch pipe 3, and when the train-pipe is charged with fluid under pressure for the purpose of releasing the brakes the fluid from the train-pipe flows through the passages 4, 6, and 7 into the main piston-chamber 8 and moves the triple-valve piston 9 into the position shown in the drawings.

While my improvement is not limited in its application to any particular form of triple-valve device, I have preferred to show it in combination with a main slide-valve 11 and a graduating-valve 12, such as is usually employed in a Westinghouse simple triple valve.

When the triple-valve piston 9 is in the position shown in Fig. 1, the graduating-valve 12 closes the port 13 in the main slide-valve 11, and the cavity 14 on the under side of the main slide-valve connects the exhaust-port 15 with the port 16, which communicates with the brake-cylinder through the passages 17 and 18. The brake-cylinder is then cut off from communication with the main-valve chamber 19 and with the auxiliary reservoir and is open to the atmosphere, and the brakes are released.

The emergency-valve 20, which is moved to its seat and held there by contact with the stem of the triple-valve piston when the brakes are released, or when the system is first charged with fluid under pressure, remains on its seat during service applications and closes communication between the brake-cylinder passage 21 and a passage 22 which leads from the train-pipe passage 4. The emergency-valve 20 extends into and through a passage 23 between the main-valve chamber 19 and the passage 22, and is so fitted therein as to prevent any appreciable flow of fluid around it.

An extension 24 on the stem 10 of the triple-valve piston 9 passes through a head or cap 25 on the emergency-valve 20, and projects into a chamber 26 formed in the emergency-valve. A smaller stem 27, which is provided with a fixed collar 28, is screwed into the end of the extension 26 and is surrounded by a light spring 29 which bears at one end against the fixed collar 28, and at the other end against a loose collar 30, which normally rests against a shoulder formed by the end of the extension 24 of the triple-valve piston-stem.

A passage 31 in the casing 2 opens at one end into the space 32 on the left of the triple-valve piston 9 and communicates at its other end with the auxiliary reservoir. Fluid from the train-pipe is admitted to the auxiliary reservoir through the usual feed-groove 33, and through the space 32 and passage 31.

The cylindrical extension 34 on the triple-valve piston 9 is so fitted in the bushing 35 as to prevent the passage of fluid around it from the space 32 on the left of the triple-valve piston, to the main-valve chamber, and is of such length that when the triple-valve piston makes its full stroke to the right the cylindrical extension is only partly withdrawn from the bushing, but not far enough to permit the passage of fluid around it from the space 32 to the main-valve chamber.

The space 32 is normally and during service applications in open communication with the main-valve chamber 19 through the passages 36, 37, 38, and 39, formed in the extension 34 and controlled by the cut-off valve 40.

The valve 40 is connected to a cut-off piston 41 which is fitted in a chamber 42, formed in the extension of the triple-valve piston, and by means of a spring 43 the valve 40 and piston 41 are normally and during service applications held in position to permit a free passage of fluid from the space 32 and from the auxiliary reservoir into the main-valve chamber 19. A cap 44 which is screwed into the triple-valve piston clamps a gasket 45 in position to form a seat for the piston 41 when it is moved to the right, and a tubular extension 46 on the cap 44 forms a pocket for one end of the spring 43. A nut 47 on the extension 46 forms a guide for the stem 48 of the cut-off piston 41, and also forms a bearing for one end of the spring 43, the other end of which bears against the piston 41.

The cut-off piston 41 is at all times exposed on one side to auxiliary-reservoir pressure, which is admitted from the space 32 on the left of the triple-valve piston through the passages 36, 37, and 38, and on its other side the cut-off piston is at all times exposed to train-pipe pressure, which is admitted from the triple-valve piston-chamber 8 through the passages 49.

A groove 51 in the emergency-valve 20 is located in position to register at one end with a passage 50 in the casing, when the emergency-valve 20 is unseated, and the other end of the groove 51 remains in communication with the passage 22. The passage 50 is in open communication at one end with the auxiliary-reservoir passage 31, and its other end is normally, and during service applications, closed by the emergency-valve 20. The chamber 26 in the emergency-valve is open to the main-valve chamber through the passages 52 in the cap 25.

The port 16 in the bushing 35, through which auxiliary-reservoir fluid is admitted to the brake-cylinder, and which in Fig. 1 is shown connected by the cavity 14 with the exhaust-port 15, opens into a passage 17, which extends circumferentially part way around the bushing 35, far enough to permit a straight passage 18, which is drilled from the left-hand end of the casing to connect with it. This arrangement of the passage 18 is merely for the purpose of avoiding communication with the passage 22, which leads from the train-pipe and will be understood by reference to Figs. 4 and 5, in which this feature of construction is the same as in Fig. 1.

When a gradual or slight reduction of train-pipe pressure is made for the purpose of effecting a service application of the brakes, the triple-valve piston 9 is moved to the limit of its stroke to the right, the first part of the movement unseats the graduating-valve 12, the further movement causes the main valve to cut off communication between the port 16 and the exhaust-port 15, and when the triple-valve piston has reached the end of its stroke the port 13 in the main slide-valve registers with the port 16. Fluid from the auxiliary reservoir which is still in communication with the main-valve chamber will then flow from the main-valve chamber 19 through the side passage 53 in the main valve, and through the passages 13, 16, 17 and 18 to the brake-cylinder, and the brakes will be applied.

As the triple-valve piston 9 moves to the right and before it reaches the end of its stroke, the loose collar 30 on the small stem 27 comes in contact with the cap 25 on the emergency-valve, but as the emergency-valve is held to its seat by the high pressure of the auxiliary-reservoir fluid which is freely admitted to the main-valve chamber through the passages controlled by the cut-off-valve device, and as the resistance of the spring 29 to compression is comparatively small, the movement of the triple-valve piston to the limit of its stroke to the right merely compresses the spring 29 without unseating the emergency-valve.

When a sufficiently great and rapid reduction of train-pipe pressure is made for the purpose of effecting an emergency application of the brakes, the triple-valve piston is moved to the limit of its stroke to the right, the loose collar 30 on the stem 27 is moved into contact with the cap 25 on the emergency-valve, and the spring 29 is compressed as in service applications, the graduating-valve and the main slide-valve are moved, as in service applications, to open communication between the main-valve chamber 19 and the brake-cylinder, and the cut-off piston 41 is moved to the limit of its stroke to the right in the chamber 42, the reduced train-pipe pressure and the pressure of the spring 43 being overcome by the auxiliary-reservoir pressure acting on the other side of the piston 41.

The movement of the piston 41 to the right, relative to the triple-valve piston, will move the cut-off valve 40 so as to close communication through the passages 38 and 39 between the auxiliary reservoir and the main-valve chamber 19, and, as the main-valve chamber is put in communication with the brake-cylinder by the movement of the main valve 11, the fluid under pressure in the main-valve chamber will be suddenly exhausted to the brake-cylinder. The sudden and great reduction of pressure thus effected in the main-valve chamber 19, by relieving the emergency-valve of the pressure which holds it to its seat, permits the spring 29 to unseat the emergency-valve and open communication from the passage 22 to the brake-cylinder passage 21, and the sudden exhaust into the brake-cylinder of the fluid under pressure in the passage 22 permits the fluid under pressure in the train-pipe to open the check-valve 54 and flow into the brake-cylinder.

When the brake-cylinder pressure has nearly equalized with the train-pipe pressure the check-valve 54 will be closed by the spring 55.

When the emergency-valve is unseated and moved to the right the groove 51 in the emergency-valve will connect the passage 50 with the passage 22, and fluid from the auxiliary reservoir will flow through the passages 31, 50, 51, 22, and 21 to the brake-cylinder.

When the train-pipe pressure is increased for the purpose of releasing the brakes, the triple-valve piston is moved to the left, the shoulder 56 on the stem 10 of the triple-valve piston abuts against the cap 25 on the emergency-valve and moves the emergency-valve to its seat, the main valve is moved to the release position, so that the passage 13 is closed, and the cavity 14 in the main valve connects the port 16 with the port 15 and fluid from the brake-cylinder escapes through the passages 18, 17, 16, 14, 15, and 57 to the atmosphere. At the same time the cut-off piston 41 is moved to the limit of its stroke to the left, relative to the triple-valve piston, by the increased train-pipe pressure and the pressure of the spring 43, and the cut-off valve 40 is moved into position to open communication between the auxiliary reservoir and the main-valve chamber through the passage 31, space 32, and passages 36, 37, 38, and 39.

In emergency applications, when the cut-off valve 40 is closed and the fluid under pressure in the main-valve chamber is released, the emergency-valve, while on its seat, will be unaffected by any fluid-pressure acting directly on it and tending to unseat it, or to hold it on its seat, and it will, therefore, require but little force to unseat it. For this reason the resistance offered to compression by the spring 29 may be comparatively small and yet be sufficient to promptly unseat the valve 20 in emergency applications without being great enough to unseat the valve in making partial or light applications of the brakes. If the resistance of the spring 29, when under compression, is such that it unseats the emergency-valve just before the completion of a full service or graduated application of the brakes no objectionable result will be produced thereby, because at that time the pressures in the train-pipe, auxiliary reservoir, and brake-cylinder are nearly equal. In view of these considerations it will be obvious that the resistance of the spring 29 may be such as to unseat the emergency-valve at the proper time and yet not be great enough to appreciably affect the operation of the triple-valve piston by the difference of pressures on its opposite sides.

In Fig. 2 of the drawings I have shown a modification of the cut-off-valve device in which the cut-off valve 40 is not connected or secured to the piston 41, but is separate therefrom and held open by the contact of the piston 41 with the stem of the valve. In emergency applications, when the piston 41 moves to the right, relative to the triple-valve piston, the valve 40 is seated by the pressure of the spring 58 and cuts off communication between the auxiliary reservoir and the main-valve chamber. The resistance of the spring 58 to compression should be such as to prevent the opening of the valve 40 by the auxiliary-reservoir pressure acting on the other side of the valve when the pressure has been released from the main-valve chamber in making an emergency application of the brakes.

In Figs. 3, 4, and 5 I have shown an application of my invention in which the main slide-valve, the graduating-valve, and the emergency-valve, and the ports and passages controlled by these valves, and the combinations of these valves with the triple-valve piston and its stem are the same as in Fig. 1.

In Figs. 3, 4, and 5, the cut-off-valve device, instead of being located in the triple-valve piston, is located in a separate chamber outside of the triple-valve piston-chamber and main-valve chamber, and the differences between the construction shown in Fig. 1 and that shown in Figs. 3, 4, and 5 are only such as result from this modification.

As shown in Figs. 4 and 5, the cut-off-valve chamber is located on one side of the main-valve chamber 19 and is connected with the auxiliary-reservoir passage 31 by means of a passage 60, which is always open, and with the main-valve chamber 19 by means of a passage 61, which is controlled by the cut-off valve 40. In this instance the cut-off valve 40 is a slide-valve which is connected with the cut-off piston 41 by means of a stem 62. A spring 63 between the stem and the valve tends to hold the valve to its seat.

The cut-off piston 41 is located in a chamber 42, which is at all times in open communication with the train-pipe through the passages 6, 64, and 65. (Shown in Figs. 3, 4, and 6.) The cut-off piston 41 is held at the upper limit of its stroke by the train-pipe pressure and the pressure of the spring 43, when the brakes are released and during service applications, and when the cut-off piston is in that position the port 61 is uncovered by the cut-off valve, and the main-valve chamber is in open communication with the auxiliary reservoir through the passage 61, chamber 59, and passages 60 and 31.

The extension 34 on the triple-valve piston 9 is so fitted in the bushing 35 as to prevent the passage of any appreciable quantity of fluid around it from the space 32 on the left of the triple-valve piston to the main-valve chamber 19.

When a gradual or slight reduction of train-pipe pressure is made for the purpose of effecting a service application of the brakes, the triple-valve piston 9 is moved to the limit of its stroke to the right, the graduating-valve 12 and the main valve 11 are moved, as in the construction shown in Fig. 1, to close communication between the brake-cylinder and the atmosphere and to open communication between the main-valve chamber 19 and the brake-cylinder. The cut-off valve 40 and the cut-off piston 41 will remain in their normal positions, and fluid will be admitted from the auxiliary reservoir through the passages 31 and 60, chamber 59, passage 61, main-valve chamber 19, and passages 53, 13, 16, 17, and 18 to the brake-cylinder.

As in the construction shown in Fig. 1, the movement of the triple-valve piston to the limit of its stroke to the right will bring the loose collar 30 on the stem 27 into contact with the cap 25 on the emergency-valve 20, and the spring 29 will be partly compressed, but the emergency-valve will remain on its seat, unless, as previously mentioned, it should be unseated by the pressure of the spring when the pressures in the auxiliary reservoir and brake-cylinder have nearly equalized. This can occur only when a full service or graduated application of the brakes is made, and at a time when the train-pipe pressure is so reduced, or so nearly equalized with the auxiliary-reservoir and brake-cylinder pressures, that the opening of the emergency-valve is immaterial.

When a sufficiently great and rapid reduction of train-pipe pressure is made to effect an emergency application of the brakes, the auxiliary-reservoir pressure acting on the upper side of the cut-off piston 41 against the reduced train-pipe pressure and the pressure of the spring 34 will move the piston 41 to the lower limit of its stroke and cause the cut-off valve 40 to close the passage 61 leading to the main-valve chamber. The triple-valve piston 9 will be moved to the limit of its stroke to the right, the main valve 11 and the graduating-valve 12 will be moved as in service applications to cut off communication between the brake-cylinder and the atmosphere and to open communication between the brake-cylinder and the main-valve chamber, and the fluid under pressure in the main-valve chamber will be released to the brake-cylinder. At the same time the loose collar 30 on the small stem 27 will be brought into contact with the cap 25 on the emergency-valve and the resistance of the spring 29 to compression will unseat the emergency-valve, which is then relieved of the pressure of the fluid which holds it to its seat.

When the emergency-valve is unseated the fluid under pressure in the passage 22 will escape through the passage 21 to the brake-cylinder, and the reduction of pressure thus effected on the back of the check-valve 54 will permit the fluid under pressure in the train-pipe to unseat the check-valve and escape to the brake-cylinder.

When the train-pipe pressure has nearly equalized with the brake-cylinder pressure the check-valve will be closed by the spring 55.

The opening movement of the emergency-valve will cause the groove 51 in the emergency-valve to connect the passage 50 with the passage 22, and fluid from the auxiliary reservoir will pass through the passages 31, 50, 51, 22, and 21 to the brake-cylinder until the auxiliary-reservoir and brake-cylinder pressures have equalized.

In the construction shown in Fig. 7 there is no connection between the triple-valve piston-stem and the emergency-valve. A stem 27$^a$ which is screwed into the emergency-valve passes through a guide 66 in the passage 21 and is provided on its outer end with a cap or fixed collar 67, which limits the opening movement of the valve. A spring 29$^a$, which is under compression when the emergency-valve 20 is on its seat, surrounds the stem 27$^a$ and bears at one end against the emergency-valve and at the other end against the guide 66. The end of the piston-stem 10 of the triple-valve device merely abuts against the cap 25 of the emergency-valve so as to move the emergency-valve to its seat in releasing the brakes, and the stem 10 continues to bear against the emergency-valve so long as the triple-valve device is in release position.

When the system is charged with fluid under pressure and the parts are in release position, the spring 29$^a$ is compressed, and the emergency-valve is held to its seat by the stem 10 abutting against the cap 25 and by the pressure of the fluid in the main-valve chamber 19, or it may be said that the emergency-valve is held to its seat by the fluid-pressure in the main-valve chamber only, since the triple-valve piston is substantially balanced by the fluid-pressure on its opposite sides, and the only resistance which it offers to movement is that due to friction.

The main valve and the graduating-valve of the triple-valve device shown in Fig. 7 are the same in construction and operation as the main and graduating valves shown in Figs. 1 and 3, and they control the same ports. Instead of employing an extension on the triple-valve piston similar to the extension 34 (shown in Figs. 1 and 3) for the purpose of separating the space 32 on the left of the triple-valve piston from the main-valve chamber 19, I provide a partition 68, which is screwed into the bushing 35. The triple-valve piston-stem 10 passes through and is so fitted in the partition 68 as to prevent the flow of fluid around the stem 10 from the space 32 to the main-valve chamber 19, or to diminish such flow so far as is possible without affecting the operation of the triple-valve piston by increased friction.

In Fig. 7 I have shown a port 61, through which the main-valve chamber 19 communicates with the auxiliary-reservoir space, as in Figs. 3 and 5, the port 61 being adapted to be controlled by a cut-off-valve device similar to that shown in Fig. 5, which is located in a chamber outside of the main-valve chamber and communicating with the auxiliary reservoir through passages 60 and 31.

In making a service application of the brakes with the construction shown in Fig. 7 the triple-valve piston moves to the limit of its stroke to the right and the main valve and graduating-valve operate as in the construction shown in Figs. 1 and 3, or as in any simple triple-valve device. In this construction the stem 10 of the triple-valve device merely moves away from the emergency-valve, and the emergency-valve remains on its seat, where it is held against the resistance of the spring 29$^a$ by the pressure of the fluid in the main-valve chamber, which pressure is substantially the same as that in the auxiliary reservoir, since the passage 61 remains open during service applications.

In making emergency applications with the construction shown in Fig. 7 the triple-valve piston will be moved to the limit of its stroke, as in service applications. The main and graduating valves will be moved, as in service applications, so as to cut off communication between the brake-cylinder and the atmosphere and to open communication between the main-valve chamber and the brake-cylinder, and the cut-off piston 41 (shown in Fig. 5) will be moved by the auxiliary-reservoir pressure acting against the reduced train-pipe pressure and the pressure of the spring 43 to cause the valve 40 to close the port 61, through which fluid from the auxiliary reservoir is admitted to the main-valve chamber 19. The opening of the ports through which the main-valve chamber is put in communication with the brake-cylinder by the movement of the triple valve and the closing of the passage 61 will cause a great and sudden reduction of pressure in the main-valve chamber, and the emergency-valve being relieved of the pressure which holds it to its seat will be unseated by the expansion of the spring 29$^a$. The fluid in the passage 22 will be discharged through the passage 21 into the brake-cylinder, and the reduction of pressure on the left of the check-valve 54 will permit the fluid under pressure in the train-pipe to lift the check-valve and to flow through the passages 22 and 21 to the brake-cylinder.

When the emergency-valve is unseated, the groove 51 in the emergency-valve will connect the passage 50 with the passage 22, and fluid from the auxiliary reservoir will flow through the passages 31, 50, 51, 22, and 21 to the brake-cylinder.

In releasing the brakes after an emergency application the emergency-valve 20 will be moved to its seat and the spring 29ª compressed by the end of the triple-valve piston-stem 10 coming in contact with the cap 25 on the emergency-valve.

It will be seen that the emergency-valve device shown in Fig. 7 differs from that shown in Figs. 1 and 3 in having the emergency-valve totally disconnected from the triple-valve piston-stem and in having the spring which actuates the emergency-valve normally and during service applications under compression. In the constructions shown in Figs. 1 and 3 the spring 29 may be so fitted between the loose collar 30 and the fixed collar 28 that it is not normally subject to compression and is compressed only when the loose collar 30 is moved by contact with the cap 25 on the emergency-valve.

The emergency-valve device shown in Fig. 7 may be employed in combination with a triple-valve device having an extension on the triple-valve piston similar to the extension 34, (shown in Fig. 3,) and if preferred the cut-off-valve device, which operates to close communication between the auxiliary reservoir and main-valve chamber in emergency applications, may be located in the extension of the triple-valve piston, as shown in Figs. 1, 2, and 11, in which case the ports or passages 60 and 61 will be dispensed with.

In Fig. 8, on the right of the figure, I have shown a modification of the cut-off-valve device shown in Fig. 5, a piston-valve 40 being employed instead of the slide-valve to cut off communication between the passage 60, leading from the auxiliary reservoir, and the passage 61, leading to the main-valve chamber 19. A plain piston 40 may be employed as a cut-off valve, since a slight leakage of fluid through the passage 61 will not interfere with the operation of the emergency-valve if the ports or passages controlled by the main and graduating valves of the triple-valve device are sufficiently large.

On the left of Fig. 8 I have shown a valve device for controlling a passage for the admission of fluid from the auxiliary reservoir to the main-valve chamber, which passage will be open when the brakes are released and the main-valve chamber is charged with fluid under pressure, and which will remain open in service applications of the brakes, but which will be at first closed in emergency applications by the reduction of pressure in the main-valve chamber caused by the action of the cut-off valve and the triple-valve device, and afterward opened by the increase of pressure in the main-valve chamber caused by the flow of fluid from the brake-cylinder to the main-valve chamber, through the ports and passages controlled by the triple-valve device, after the discharge of fluid from the train-pipe to the brake-cylinder.

As shown in Fig. 8, a chamber 69 is in open communication with the auxiliary reservoir through the passages 70 and 31, and with the main-valve chamber 19 through a passage 71. A piston 72 is fitted in the chamber 69, between the passages 70 and 71, and is connected to a valve 73, which controls communication between the passage 70 and a small passage 74, which opens into the main-valve chamber. The piston 72 is exposed on its upper side to the pressure of the fluid in the auxiliary reservoir, which tends to close the valve 73, and on its under side to the pressure of a spring 75, which tends to open the valve 73. The pressure exerted by the spring 75 against the piston 72 when the spring is under compression is much less than the normal fluid-pressure acting on the upper side of the piston 72, so that in emergency applications, when the pressure in the main-valve chamber is released by the operation of the triple-valve device and the closing of the cut-off valve 40, the auxiliary-reservoir pressure, acting on the upper side of the piston 72, will move the piston 72 down and compress the spring 75 and close the valve 73, thus cutting off communication between the auxiliary reservoir and the main-valve chamber through the passages 31 70, chamber 69, and passage 74. When in emergency applications the fluid from the train-pipe has been discharged into the brake-cylinder, fluid from the brake-cylinder will flow into the main-valve chamber through the passages 18, 17, and 16, and through the passages 13 and 53 in the main valve of the triple-valve device, until the pressures in the brake-cylinder and main-valve chamber have equalized. The under side of the piston 72 will be exposed to the pressure of the fluid in the main-valve chamber, which is admitted to the piston 72 through the passage 71, and this fluid-pressure, assisted by the spring 75, will move the piston 72 and valve 73 upward, so as to open communication between the auxiliary reservoir and main-valve chamber through the passages 31 70, chamber 69, and passage 74. The main-valve chamber will thus be charged with fluid under pressure from the auxiliary reservoir, which fluid will flow to the brake-cylinder through the passages 53 and 13 in the main valve, through the passage 16 in the bushing 35, and through the passages 17 and 18 in the casing, until the auxiliary-reservoir and brake-cylinder pressures have equalized. When this means is employed for releasing fluid from the auxiliary reservoir to the brake-cylinder, after the release of fluid from the train-pipe in emergency applications, the employment of the passage 50 (shown in Figs. 1, 3, and 7) and of the groove 51 in the emergency-valve will not be necessary.

The capacity of the passage 74 (shown in Fig. 8) is considerably less than the capacity of the ports and passages controlled by the main and graduating valves, so that when the cut-off valve 40 closes the passage 61 the movement of the main and graduating valves into position to apply the brakes will cause a sufficient reduction of pressure in the main-valve chamber to permit the auxiliary-reservoir pressure to move the piston 72 down and close the valve 73, after which the complete exhaust of fluid from the main-valve chamber will be effected. While this means for effecting a discharge of fluid from the auxiliary reservoir to the brake-cylinder, after the release of fluid from the train-pipe, is shown in Fig. 8 in combination with a cut-off valve located outside of the main-valve chamber and independent of the triple-valve piston, it will be obvious that it may be employed with a construction similar to that shown in Fig. 1, in which the cut-off-valve device is located in the triple-valve piston.

In Fig. 9 I have shown a construction in which the valve 73 and the spring-pressed piston 72 are located in and movable with a slide-valve 76. The valve 76 is connected to and operative by the movement of the spring-pressed piston 41, which is shown in its normal position, and in the position which it occupies in service applications of the brakes. The piston 72 is located in a chamber 69, which is formed in the valve 76, and is exposed on its under side to the pressure of a spring 75 and on its upper side to the pressure of the fluid in the auxiliary reservoir, which is admitted to the chamber 59 through the passages 31 and 60, and to the chamber 69, within the valve 76, through the passage 70. The chamber 69, within the valve 76, is normally in communication with the main-valve chamber 19 through the port 77 in the valve 76, and through the passage 61, and communication between the chamber 59 and the main-valve chamber 19 remains open during service applications, permitting the flow of auxiliary-reservoir fluid through the passage 70, chamber 69, port 77, and passage 61 into the main-valve chamber 19. The valve 73 controls communication between a normally-closed port 79 formed in the face of the valve 76 and the passage 70, which opens through the side of the valve 76 and connects the chamber 59 with the chamber 69 in the valve 76. A port 78, which is normally closed, is formed in the face of the slide-valve 76 and opens into the chamber below the piston 72.

In emergency applications, the auxiliary-reservoir pressure in the chamber 59, acting on the upper side of the piston 41, moves the piston 41 downward to the limit of its stroke, against the reduced train-pipe pressure and the pressure of the spring 43, and moves the slide-valve 76 into position to cause the port 78 to register with the passage 80 leading to the brake-cylinder passage 18 and to cause the port 79 to register with the passage 61. The port 77 in the valve 76 is then closed, and since there is no pressure in the brake-cylinder there will be no fluid-pressure below the piston 72, and the auxiliary-reservoir pressure acting on the upper side of the piston 72 will hold the valve 73 on its seat and cut off the flow of auxiliary-reservoir fluid through the port 79 and passage 61. The supply of auxiliary-reservoir fluid to the main-valve chamber being cut off and the main valve and graduating-valve of the triple-valve device being moved into position to open communication between the main-valve chamber 19 and the brake-cylinder, the pressure in the main-valve chamber will be released and the emergency-valve will be opened. When the fluid under pressure in the train-pipe has been discharged into the brake-cylinder, the fluid in the brake-cylinder will act on the piston 72 through the passages 18 80 and port 78, and this fluid pressure, together with the pressure of the spring 75, will be sufficient to move the piston 72 upward against the auxiliary-reservoir pressure acting on the upper side of the piston 72 and the valve 73 will be unseated. Fluid under pressure from the auxiliary-reservoir will then flow through the passages 31 60, chamber 59, port 70, chamber 69 in the valve 76, port 79, and passage 61 into the main-valve chamber 19, and from the main-valve chamber to the brake-cylinder through the ports and passages opened by the main valve and graduating-valve of the triple-valve device. When this construction is employed the passages 50 and 51, which are opened by the movement of the emergency-valve, may be dispensed with.

In the modification shown in Fig. 10 the cut-off valve 40 is a slide-valve with a port 81, extending through it in position to register with the passage 61 when the valve is in its normal position. When the brakes are released and during service applications, the piston 41 and the cut-off valve 40 are in the positions shown in the drawings, and when the piston 41 is moved downward to the limit of its stroke, in emergency applications, the valve 40 closes the passage 61 and cuts off the flow of fluid from the auxiliary reservoir to the main-valve chamber, thereby permitting the pressure to be fully released from the main-valve chamber through the passages controlled by the triple-valve device, and causing the opening of the emergency-valve device. When the valve 40 (shown in Fig. 10) is moved downward to close the passage 61, the port 81 in the valve 40 registers with the passage 80, which opens into the brake-cylinder passage 18, and fluid under pressure from the auxiliary reservoir flows through the port 81 and passages 80 and 18 to the brake-cylinder. When this construction is employed, the passage 50 and groove 51, which are connected by the opening movement of the emergency-valve for the purpose of permitting fluid to flow from the auxiliary reservoir to the brake-cylinder in emergency applications, may be dispensed with. The construction shown in Fig. 10 may be employed with either of the constructions shown in Figs. 3 and 7.

Fig. 11 shows a modification of the cut-off-valve device shown in Fig. 1, in which the cut-off valve is provided with a passage 82 extending through it, and the inner end of the cut-off-valve chamber is not open to the main-valve chamber as in Fig. 1, so that the cut-off valve is at all times exposed to auxiliary-reservoir pressure on its opposite sides instead of being exposed on one side to the pressure in the main-valve chamber. The effective area acted on by the auxiliary-reservoir pressure to move the cut-off valve in emergency applications is thus increased.

My invention is not limited to a construction in which the emergency-valve controls a port leading to the brake-cylinder, as it is obvious that, without any change whatever in the construction shown, the port 21 may be connected with some other space or chamber or with the atmosphere, and the passage 22 instead of leading directly from the train-pipe may lead from a supplemental reservoir to the brake-cylinder port.

While I have shown and described certain elements of construction as examples of the means by which my invention may be applied, it will be understood that my invention is not limited to the exact construction shown where well-known and recognized equivalents may be substituted for any of the elements. For example, the substitution of a weight, which may be regarded as and in many cases is the equivalent of a spring, would come within the scope of my invention. This will be obvious if we suppose that my improved apparatus is employed in such a manner as to cause the emergency-valve to move in a vertical direction. A weight acting on the valve would then have the same function as the spring 29, or the weight of the valve 29 if great enough would have the same effect.

I claim as my invention and desire to secure by Letters Patent—

1. In an automatic fluid-pressure brake apparatus, an emergency-valve device which is normally and during service applications held closed by fluid under pressure, a valve device controlling a passage for the release of the fluid under pressure which may be opened without effecting the operation of the emergency-valve, and means for cutting off the supply of fluid and thereby effecting an emergency application of the brakes, substantially as set forth.

2. In an automatic fluid-pressure brake apparatus, the combination with an emergency-valve device which is held closed by the pressure of fluid in a chamber, means for releasing fluid under pressure from the chamber in both service and emergency applications of the brakes, and means for cutting off the supply of fluid to the chamber and thereby effecting the operation of the emergency-valve device, substantially as set forth.

3. In an automatic fluid-pressure brake apparatus, an emergency-valve device which is actuated in one direction by fluid under pressure to close the valve, and in the opposite direction by the pressure of a spring, unassisted by the pressure of any fluid, to open the valve, substantially as set forth.

4. In an automatic fluid-pressure brake apparatus, the combination with a triple-valve device of an emergency-valve device which is exposed to the pressure of the fluid in the main-valve chamber of the triple-valve device, a passage through which fluid is released from the main-valve chamber in both service and emergency applications of the brakes, and means for cutting off the supply of fluid to the main-valve chamber in emergency applications, and thereby permitting the release of fluid-pressure from the emergency-valve device and the opening of the emergency-valve, substantially as set forth.

5. The combination, in a triple-valve device, of a simple triple valve which is adapted to open communication between the main-valve chamber and the brake-cylinder by a single traverse of the triple-valve piston in both service and emergency applications of the brakes, an emergency-valve device which is exposed to the pressure in the main-valve chamber and held closed thereby, and means for cutting off the supply of fluid to the main-valve chamber and thereby causing the opening of the emergency-valve, substantially as set forth.

6. The combination, in a triple-valve device, of an emergency-valve device which is held to its seat by fluid under pressure in the main-valve chamber, means for cutting off the supply of fluid to the main-valve chamber and thereby causing the operation of the emergency-valve device, and means for admitting fluid under pressure from the auxiliary reservoir to the brake-cylinder after cutting off the supply to the main-valve chamber, substantially as set forth.

7. The combination, in a triple-valve device, of a main valve which opens communication between the main-valve chamber and the brake-cylinder by a single traverse of the triple-valve piston in both service and emergency applications of the brakes, a cut-off valve for closing the discharge from the auxiliary reservoir in emergency applications of the brakes, and an emergency-valve which is opened when the discharge from the auxiliary reservoir is closed and whose opening movement is effected by the closure of the cut-off valve, substantially as set forth.

8. In a fluid-pressure brake apparatus, the combination, with an auxiliary reservoir and a brake-cylinder of a valve device controlling a passage through which fluid may be admitted from the auxiliary reservoir to the brake-cylinder and which is opened by the pressure in the brake-cylinder, substantially as set forth.

9. In a fluid-pressure brake apparatus, the combination, with an auxiliary reservoir and a brake-cylinder, of a valve device controlling a passage through which fluid under pressure may be admitted from the auxiliary reservoir to the brake-cylinder in emergency applications and which is opened by the pressure in the brake-cylinder, substantially as set forth.

10. In a fluid-pressure brake apparatus, the combination, with an auxiliary reservoir and brake-cylinder, of a valve device controlling a passage through which fluid under pressure may be admitted from the auxiliary reservoir to the brake-cylinder and which is closed by the auxiliary-reservoir pressure when little or no pressure exists in the brake-cylinder, and which is opened by an increase of pressure in the brake-cylinder, substantially as set forth.

11. In an automatic fluid-pressure brake apparatus, the combination, with a triple-valve device, of a cut-off-valve device for closing communication between the auxiliary reservoir and the main-valve chamber of the triple-valve device, and means for opening communication between the auxiliary reservoir and the brake-cylinder, substantially as set forth.

12. In an automatic fluid-pressure brake apparatus, the combination, with a triple-valve device, of a cut-off-valve device for closing communication between the auxiliary reservoir and the main-valve chamber, and means for opening communication between the auxiliary reservoir and the brake-cylinder independent of the triple-valve device, substantially as set forth.

13. In an automatic fluid-pressure brake apparatus, the combination, with a triple-valve device, of a cut-off-valve device for closing communication between the auxiliary reservoir and the brake-cylinder, and means for opening communication between the auxiliary reservoir and the brake-cylinder independent of the triple-valve device, substantially as set forth.

14. In a triple-valve device, the combination, with a triple-valve piston, of an emergency-valve, which is adapted to be seated by the movement of the triple-valve piston in releasing the brakes, and which is held to its seat by the pressure in the main-valve chamber, and unseated by the pressure of a spring, substantially as set forth.

15. In an automatic fluid-pressure brake apparatus, the combination, with a triple-valve device, of a cut-off valve for closing communication between the main-valve chamber of the triple-valve device and the auxiliary reservoir, and a piston for actuating the cut-off valve which is exposed on one side to auxiliary-reservoir pressure and on the other side to the pressure in the train-pipe, substantially as set forth.

In testimony whereof I have hereunto set my hand.

THOMAS J. HOGAN.

Witnesses:
DARWIN S. WOLCOTT,
F. E. GAITHER.